United States Patent
Kröselberg et al.

(10) Patent No.: US 8,036,191 B2
(45) Date of Patent: Oct. 11, 2011

(54) MOBILE STATION AS A GATEWAY FOR MOBILE TERMINALS TO AN ACCESS NETWORK, AND METHOD FOR REGISTERING THE MOBILE STATION AND THE MOBILE TERMINALS IN A NETWORK

(75) Inventors: Dirk Kröselberg, München (DE); Maximilian Riegel, Nürnberg (DE); Hannes Tschofenig, Espoo (FI)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 12/097,747

(22) PCT Filed: Dec. 6, 2006

(86) PCT No.: PCT/EP2006/069389
§ 371 (c)(1),
(2), (4) Date: Dec. 2, 2008

(87) PCT Pub. No.: WO2007/068640
PCT Pub. Date: Jun. 21, 2007

(65) Prior Publication Data
US 2009/0207819 A1 Aug. 20, 2009

(30) Foreign Application Priority Data
Dec. 16, 2005 (DE) .......... 10 2005 060 349
Mar. 31, 2006 (DE) .......... 10 2006 015 033

(51) Int. Cl.
*H04W 4/00* (2009.01)

(52) U.S. Cl. ........ 370/338; 370/328; 370/329; 370/332; 370/352; 370/401; 455/410; 455/411; 455/432.1; 455/435.1; 709/223; 709/224; 709/225; 709/226; 709/227; 709/228; 709/229

(58) Field of Classification Search .................. 455/410, 455/411, 41.2, 432.1, 435.1, 7, 11.1; 370/338, 370/401, 328, 329, 310.2, 392, 393, 332, 370/315, 352, 331; 709/223, 224, 225, 226, 709/227, 228, 229, 230, 220; 380/247, 270, 380/277, 279, 281; 713/168, 169, 170, 171
See application file for complete search history.

(56) References Cited

U.S. PATENT DOCUMENTS
6,785,256 B2 * 8/2004 O'Neill ................... 370/338
(Continued)

FOREIGN PATENT DOCUMENTS
DE 10 2004 008 760 9/2005
(Continued)

OTHER PUBLICATIONS
RFC 2002 http://www.ietf.org/rfc/rfc2002.txt, Oct. 1996.
(Continued)

*Primary Examiner* — Olumide T Ajibade Akonai
(74) *Attorney, Agent, or Firm* — Staas & Halsey LLP (57) ABSTRACT

A mobile station is designed, as a gateway for one or several mobile terminals, to establish a connection between the mobile terminal(s) and an access network. The mobile station supports a network-based mobility management such that the mobile station acts as a client instead of the mobile terminals during communication with a home agent of a home network or intermediate network connected to the access network in the framework of a mobile IP connection.

19 Claims, 4 Drawing Sheets

U.S. PATENT DOCUMENTS

| | | | |
|---|---|---|---|
| 6,910,074 B1* | 6/2005 | Amin et al. | 709/227 |
| 6,999,731 B2* | 2/2006 | Cronin | 455/88 |
| 7,168,090 B2* | 1/2007 | Leung | 726/4 |
| 7,231,521 B2* | 6/2007 | Buddhikot et al. | 713/171 |
| 7,269,173 B2* | 9/2007 | Iyer et al. | 370/395.31 |
| 2004/0114559 A1 | 6/2004 | Wang | |
| 2004/0142657 A1 | 7/2004 | Maeda | |
| 2005/0078824 A1* | 4/2005 | Malinen et al. | 380/247 |
| 2005/0169220 A1* | 8/2005 | Sreemanthula et al. | 370/338 |
| 2007/0016774 A1* | 1/2007 | Bakshi | 713/168 |
| 2007/0076608 A1* | 4/2007 | Samuel et al. | 370/230 |
| 2007/0189219 A1* | 8/2007 | Navali et al. | 370/331 |
| 2007/0274269 A1 | 11/2007 | Schmitt et al. | |

FOREIGN PATENT DOCUMENTS

| | | |
|---|---|---|
| EP | 1 578 067 | 9/2005 |

OTHER PUBLICATIONS

Multiple Hosts behind MS/WiMAX Forum Network Working Group; WiMAX End-to-End Network Systems Architecture 2005 Wimax Forum.
RFC 3775 http://www.ietf.org/rfc/rfc3775.txt, Jun. 2004.
RFC 2997 http://www.ietf.org/rfc/rfc.txt?number=2977, Oct. 2000.
RFC 3344 http://www.ietf.org/rfc/rfc3344.txt, Aug. 2002.
RFC 3846—Johannsen, Mobile IPv4 Extension for Carrying Network Access Identifiers, Jun. 2004.
RFC 3957 http://www.ietf.org/rfc/rfc3775.txt?number=3957, Mar. 2005.
RFC 3776 http://www.ietf.org/rfc/rfc3776.txt?number=3776, Jun. 2004.
RFC 4285 http://www.ietf.org/rfc/rfc4285.txt, Jan. 2005.
Standard IEEE 802.16, 2001.
RFC 3748 http://www.ietf.org/rfc/rfc3748.txt, Jun. 2004.
IEEE 802.16e D11 2005.
Standard IEEE 802.11.
Madjid Nakhjiri Narayanan Venkitaraman, Motorola Labs: "EAP Based Proxy Mobile IP Key Bootstrapping for WiMAX", IETF Standard-Working-Draft, Internet Engineering Task Force, IETF, CH, Jan. 2005.
Internet Draft: Document: draft-ng-nemo-aaa-use-00.txt C.W. Ng, Panasonic Singapore Labs, T. Tanaka, Apr. 2003, "Usage Scenario and Requirements for AAA in Network Mobility Support".
NEMO Working Group, Internet Draft; T. Ernst, Keio University, H.-Y. Lach, Motorola Labs, Oct. 24, 2005, "Network Mobility Support Terminology", draft.ietf-nemo-terminology-04.
Standard IEEE 802.3-2002.
Parviz Yegani; Parviz Yegani, "WiMAX Overview", IETF-64, 7.-11. Nov. 2005, Vancouver, Canada, http://www3.ietf.org/proceedings/05nov/slides/16ng-4.pdf; Parviz Yegani, "WiMAX Overview", IETF-64, 7.-11. Nov. 2005, Vancouver, Canada, http://www3.ietf.org/proceedings/05nov/slides/16ng-4.pdf.
Buddhikot, Milind M.; Chandranmenon, Girish; Han, Seungjae et al.: Design and Implementation of a WLAN/CDMA2000 Interworking Architecture. IEEE Communications Magazine, vol. 41; No. 11, Nov. 2003, pp. 90-100.
Zhang, Xiaowei; Castellanos, Javier Gomez; Campbell, Andrew I.: P-MIP: Paging Extensions for Mobile IP. Mobile Networks and Applications, vol. 7, No. 2, Apr. 2002, pp. 127-141.
Wei, Hung-yu; Gitlin, Richard D.: MobiCom Poster: IP Paging in Mobile Multihop Networks. ACM SIGMOBILE Mobile Computing and Communications Review, vol. 7, No. 1, Jan. 2003, pp. 71-73.
Cristache, Gabriel; David, Klaus; Hildebrand, Matthias: Aspects for the Integration of Ad-hoc and Cellular Networks, 3rd Scandinavian Workshop on Wireless Ad-hoc Networks, ADHOC '03, Stockholm, May 6-7, 2003, Proceedings, pp. 1-5.
German Office Action mailed Dec. 20, 2010 in corresponding German patent application No. 10 2006 015 033.3-31.

* cited by examiner

MOBILE STATION AS A GATEWAY FOR MOBILE TERMINALS TO AN ACCESS NETWORK, AND METHOD FOR REGISTERING THE MOBILE STATION AND THE MOBILE TERMINALS IN A NETWORK

CROSS REFERENCE TO RELATED APPLICATIONS

This application is based on and hereby claims priority to German Application No. 10 2005 060,349.1 filed on Dec. 16, 2005, German Application No. 10 2006 015 033.3, filed on Mar. 31, 2006 PCT Application No. PCT/EP2006/069389 filed on Dec. 6, 2006, the contents of which are hereby incorporated by reference.

BACKGROUND OF THE INVENTION

The invention relates to a mobile station (MS-GW), which is configured as a gateway for one or more mobile terminals (ME) to establish a connection between the mobile terminal or terminals (ME) and an access network (ASN). The invention also relates especially to such mobile stations which communicate, wirelessly with access networks (ASN) such as with WiMAX networks for example.

A protocol for an Inter-Proxy communication for Mobile IP is disclosed in US 2004/0114559 A1. When using Mobile IP a mobile node can communicate over the Internet through mediation of a home agent of its home network and a foreign agent of a visited network. A base station of the visited network is embodied to initiate a registration and deregistration of the mobile node at this point.

In EP 1 578 067 A1 a control unit for controlling a mobile network and a method for controlling the mobile network are disclosed. The control unit is assigned to a mobile router which features at least one interface to a base station of a global network and at least one interface to at least one mobile node. The mobile router and the mobile node connected thereto form a mobile network. The control unit allows the mobile router multi-homing and thus switchover to another of its interfaces, which features a path to the global network if the path to the global network via the currently used interface is interrupted.

T. Ernst, H-Y. Lach: "Network Mobility Support Terminology", draft-ieff-nemo-terminology-04, NEMO Working Group Internet Draft, 24 Oct. 2005, discloses terminology for mobile networks.

C. W. Ng, T. Tanaka: "Usage Scenario and Requirements for AAA in Network Mobility Support", draft-ng-nemo-aaa-use-00.txt, Internet-Draft, October 2002, discloses possible uses of AAA protocols and operations in mobile networks.

Networks which are to provide mobile terminals such as laptops, PDAs, etc. with access to the Internet for example, are subject to particular requirements regarding mobility management. The conventional Internet Protocol was not originally designed for mobile use. In stationary computers that exchange data or packets a fixed IP address can basically be assigned for the period of the connection. If these computers roam between different subnetworks, in accordance with the conventional IP standard the connection can no longer be maintained. There is also no provision for the network address itself to be changed within the course of a connection or if the change is made it results in the connection being aborted.

The DHCP (Dynamic Host Configuration Protocol) makes it possible to dynamically assign an IP address on the basis of a dedicated server and further configuration parameters to a terminal or a station in a network. Such a device, as soon as it is connected to a network, is automatically allocated a (still free) IP address by the DHCP protocol. If DHCP is installed on a mobile terminal, it merely needs to be in the area of a local network which supports configuration via the DHCP protocol. The DHCP protocol makes dynamic address allocation possible, i.e. a free IP address is automatically allocated for a specific time. After this time elapses the request must either be made again by the mobile computer or the IP address can be issued in some other way.

With DHCP a mobile terminal can be linked into a network without manual configuration. The only requirement is the availability of a DHCP server. In this way the mobile terminal can use services of the local network. If a mobile terminal or a mobile station offers services itself however, a potential service user cannot address this device in a suitable way, since its IP address changes in each network into which it is connected.

Despite DHCP the requirements for mobility are thus not fulfilled by the conventional Internet Protocol (IP). A special protocol, Mobile IP (MIP) has thus been created which takes account of the specific requirements. With Mobile IP a mobile terminal or a mobile station is given an IP address which it also retains when located in another network.

With conventional IP it would be necessary in such cases to adapt the IP address setting accordingly for the router involved. A constant adaptation of IP and routing configurations at the terminal is not practicable however. The MIP protocol (RFC 2002, RFC 2977, R. C., RFC3846, RFC3957, RFC3775, RFC3776, RFC4285) on the other hand supports the mobility of mobile terminals by assigning to the terminal two IP addresses, namely a permanent home address and a second, temporary care-of address. The care-of address is the IP address under which the mobile terminal is currently—e.g. in a network that it is visiting—accessible. The communication to the mobile terminal of information directed to the permanently available home address is effected by home and foreign agents.

The home agent is a proxy of the mobile terminal whenever the mobile terminal is not in the original home network. The home agent is constantly informed about the current location of the mobile computer. The home agent usually represents a component of a router in the home network (or an intermediate network) of the mobile terminal. If the mobile terminal is located outside the home network, the home agent provides a function whereby the mobile terminal can register. The home agent thereafter forwards data packets addressed to the mobile terminal into the current network of the mobile terminal.

A foreign agent is located in that network in which the mobile terminal is moving. The foreign agent forwards incoming data packets to the mobile terminal or to the mobile computer. In such cases the foreign agent likewise usually represents a component of a router and routes administrative mobile data packets between the mobile terminal and its home agent. The foreign agent unpacks the tunneled data packets sent by the home agent and forwards their data to the mobile terminal.

So that a mobile terminal can be linked into a network it must first ascertain whether it is in its home network or a foreign network. In addition the mobile terminal must ascertain which station is in the (if necessary) visited network of the home or foreign agent. This information is determined by an agent discovery.

Through a registration the mobile terminal can notify its current location to its home agent (HA). To do this the mobile terminal sends the home agent the current care-of-address— as part of a registration request to the home agent. The home agent (HA) responds with a registration response.

The registration is safeguarded by an authentication conducted beforehand. Thereafter the mobile terminal and the home agent have common secret keys available to them for example. The task of authentication is undertaken by an authentication server, also called an AAA server (AAA: Authentication, Authorization and Accounting) assigned to the home agent in the Home Connectivity Serving Network of the mobile terminal. If the home agent is in a visited Connectivity Serving Network (CSN) it is provided in this network with a proxy authentication server. The home agent and the authentication server or its proxy can be modules on one and the same computer.

Mobile data networks are as a rule implemented by radio connections. The messages must then cover longer distances over air interfaces and are thus easily accessible to potential attackers. With mobile and wireless data networks security aspects thus have a particular role to play. A mobile terminal thus mostly possesses as a first point of departure in a visited network an access network (Access Serving Network, ASN), which includes the base station for wireless transmission. As well as the agreement of keys for communication with the authentication servers and the home agents, further keys are thus also required for radio data communication.

In addition to the known WLAN (Wireless Local Area Network, Standard IEEE 802.11) technology, as wireless access for mobile stations, in the recent past a much more promising wireless access technology has become known, which also achieves greater ranges of up to 30 km or more (line of sight) with high data throughput rates of 75 Mb/s: WiMAX (Worldwide Interoperability for Microwave Access). Because of its restricted transmit power, WLAN reaches speeds at distances of 100 m (direct line of sight) of 54 Mb/s. Whereas with WLAN hotspots can thus only be implemented within buildings, with WiMAX entire areas of towns can be selected as Metrospots allocated (around 800-1000 m radius). Three frequency bands around 2.6 GHz, 3.5 GHz and 5.8 GHz with bandwidths of 100-200 MHz are provided for WiMAX.

WiMAX supports two variants of Mobile IP, with which a macro mobility management is made possible: Proxy—Mobile IP and Client—Mobile IP (based on Mobile IPv4 or v6).

With Client-MIP (CMIP) the mobile terminals or the mobile stations have mobile functionality. In particular the terminal or the station is provided with its own IP address and with that of its home agent and possesses a corresponding key for communication. The terminal or the station then has so-called terminal-based mobility management available to it.

With Proxy MIP (PMIP) the MIP client functionality is implemented by the WiMAX access network (WiMAX-ASN) instead of through the mobile station itself. The functionality provided in the access network (ASN) is referred to as the Proxy Mobile Node (PMN) or as PMIP-Client. With this configuration such a terminal can also gain access to connectivity serving and home networks that Mobile IP does not currently support. The PMIP-Client takes over the MIP signaling as a proxy for the actual client, the mobile terminal. The mobile terminal then draws benefit from a so-called network-based mobility management, which is provided for it by the PMIP-Client.

Mobility management or macro mobility management (macro MM) are taken here to mean the method of operation during the handover of a mobile stations or of a mobile terminal which switches between two access networks (ASN) or between networks of two network providers (NAP, Network Access Provider). Macro MM is also referred to in WiMAX as R3 mobility or Inter-ASN mobility.

In both cases the home network (HN), i.e. the service provider of the user at the distant end from the mobile terminal or CMIP/PMIP client must likewise support Mobile IP in order to make communication possible. Thus, in any registration following authentication for example, the home agent (HA) requests security parameters from the authentication server (AAA-MS) of the mobile station (MS). These parameters are needed so that only an authorized client can register with the home agent (HA).

Also in accordance with Mobile IP the CMIP or PMIP client is allocated the address of the home agent (HA). The home agent (HA) can be located in such cases in the home network (HN) or also in the connectivity serving network (CSN). These basic functionalities must be preserved.

Proxy-Mobile IP supports the mobility of non-MIP-enabled mobile terminals (ME). The corresponding PMIP client is located in such cases in a gateway (GW), which is positioned in the access network (ASN) with which the mobile terminals (ME) communicate wirelessly via a base station (BS).

If however the mobile terminals are now to be assigned to other network access providers (NAP) (different subscriptions for roaming), a not inconsiderable outlay arises for that network operator that operates the gateway in the access network in order to map this expanded functionality in the PMIP client in the gateway of the access network. He must then namely also provide in the access network ASN the AAA infrastructure required there for network registration.

In the case of WLAN networks DSL gateways are often used in the home area and not on a network provider side. Behind such gateways—seen from the viewpoint of the network providers—mobile terminals are accessible. In this case only the subscription with the one network provider himself who has provided the gateway is possible. The mobile terminals do not possess any subscription.

In public WLAN networks, such as hotspots as wireless hotel networks etc., on the other hand subscriptions with other network providers are fully provided. The requirement is merely that the hotspot provider has concluded a contract with the third-party network provider and accordingly establishes connections for the mobile terminals in the hotspot.

An EAP-based authentication (EAP: Extensible Authentication Protocol, RFC 3748) is actually provided both for the gateway and also for the terminals, if the gateway provides an authenticator functionality. However the gateway here possesses no functionality for determination of the respective home network of the mobile terminals.

To this end the gateway must namely at least be in possession of the address and a common key with the relevant responsible authentication server of the home network of a mobile terminal.

Furthermore with these WLAN scenarios the mobile terminals and also the gateway itself do not possess any mobility; they are for example dependent on the location of the hotel.

SUMMARY

There is thus the requirement to grant non-MIP-enabled terminals a secure access to their respective home network and simultaneously to guarantee their mobility, but in doing so to keep the effort for the implementation of the associated mobility management low.

It is proposed that the PMIP client, which makes possible a network-based mobility management be assigned a mobile station (MS-GW) which is configured as a gateway for one or more mobile terminals (ME). Compared to the known variant of Proxy Mobile IP the PMIP, client functionality is thus relocated from gateways in the access network (ASN) in the area of the mobile terminals (ME).

The terms mobile station and mobile terminal as such can basically also refer to the same types of computer. However the mobile station here has the property of being able to be configured as a gateway. It thus additionally possesses features extending beyond those of the mobile terminals such as on the logical side address tables of the terminals registered in the terminal network and on the physical side e.g. network cards for network cable connection and/or transceiver devices for wireless radio waves. The terminal network is determined by the Infrastructure network of the mobile station (MS-GW) used as the gateway. The gateway however possesses two data inputs/outputs, to enable it to establish connections between networks and/or individual peers.

In accordance with embodiments the mobile terminals communicate with the gateway mobile station (MS-GW) wirelessly or by wire. Examples are a local WLAN network or an Ethernet cable network.

The proposed configuration can be used to particular advantage in WiMAX networks. The gateway mobile station then communicates on its output side—seen from the mobile terminals—wirelessly with a base station (BS) of an access network (ASN). Here too a gateway (ASN-GW) can be set up. From this the connection can be travel further via communication serving networks to the home network both of the mobile station (MS-GW) and also the mobile terminals (ME). In particular these home networks can be different so that any subscriptions are possible for the mobile terminals.

Instead of a wide-coverage WiMAX networks the mobile station can however also be used on the server side in a WLAN network. With WiMAX networks however the benefit of the proposed configuration is much more evident: a common carrier transport operator can carry the gateway mobile station (MS-GW) with them. Passengers getting onto these common carriers can freely register with their mobile terminal (ME) with their home network (HN2)—and can do so via the gateway mobile station (MS-GW). Examples of such a common carrier are taxis, busses, trains, aircraft, ships etc. For coverage with WIMAX of less than 1 km in densely populated areas good network coverage can be necessary.

Because the gateway mobile station (MS-GW) contributes the PMIP functionality the terminals do not need to have Mobile IP installed. The gateway mobile station (MS-GW) namely appears as client in the mobile IP connection instead of the mobile station in the communication with a home agent (HA) of the communication serving network (CSN) connected to the access network (ASN).

An important object is also to guarantee as secure support of mobile terminals (ME), which do not communicate directly with the WiMAX access network but are connected via a wireless technology such as WLAN IEEE 802.11 or WiMAX IEEE 802.16 or via a wired technology such as Ethernet IEEE 802.3 with the WiMAX-enabled gateway MS, within the framework of the WiMAX architecture for access to the WiMAX network.

An important component is represented here by key management. For communication between the mobile terminals (ME) and their respective home agent (HA) a separate key (PMIP-KEY) is set up, with which the mobile station (MS-GW) secures the corresponding messages. Further a separate key (GW-AAA-KEY) is set up, with which the mobile station (MS-GW) secures the exchange of messages with a proxy authentication server (AAA-P) in the access network (ASN).

In accordance with different embodiments, different variants are conceivable as to how these keys (PMIP key, GWAAA key) will be created or stored in the mobile station used as a gateway (MS-GW).

A first embodiment makes provision for this (first) Key (PMIP key) to be derived from an already existing (second) key (CMIP key). Such a key is available for example if the mobile station used as the gateway (MS-GW) for the purposes of its own mobility itself operates a terminal-based mobility management (CMIP). The second key (CMIP key) is created on registration of the mobile station (MS-GW) with its authentication server (AAA-MS) or created or preconfigured in the EAP-based authentication.

Such a second key can also be transmitted as key information (MSK) from the authentication server in order to protect the air interface in WiMAX or WLAN against attacks by third parties. Then the first key (PMIP key, GW-AAA key) is derived from this key information.

A further embodiment makes provision for the first key (PMIP key, GW-AAA key) as such to be preconfigured in the mobile station. Preconfiguration means here that it is already present in the mobile station used as the gateway (MS-GW) before the steps of authentication, address allocation, registration etc.

The security relationship between a mobile station not used as a gateway and a proxy authentication server (AAA-P) has previously usually been statically preconfigured without the presence of an automated mechanism for key distribution. To this extent the said variants of a dynamic transmission or derivation of the first key (PMIP key, GW-AAA key) from existing or transmitted keys (MSK, CMIP key etc.) represent advantageous embodiments because the effort for preconfiguration is significantly reduced.

Basically, since two parties are always communicating, the first key (in the case of the PMIP key) must not only be present in the mobile station (MS-GW) but also in the authentication F server (AAA-MS). In the case of preconfiguration it is also possible however to store the key (PMIP key) directly in the responsible Mobile IP home agent (HA)—instead of the authentication server (AAA-MS), if this key (PMIP key) is unique and not dynamically allocated for the MS.

In the case of the authentication key (GW-AAA key), because the responsible proxy authentication server (AAA-P) in accordance with the proposed configuration is already set up in the access network (ASN), this key is accordingly stored in the Foreign Agent (FA) as an alternative to the proxy authentication server (AM-P).

A further embodiment makes provision for a simplified key management to be set up to the extent that for many or all mobile terminals (ME) registered in the terminal network (EN) at the mobile station (MS-GW) the same first key (PMIP key, GW-AAA key) is used in communication with the home agent (HA).

To make authentication of a mobile terminals by EAP-based protocol in relation to the respective home network (HN2) of the ME, as soon as the mobile terminal is connected via a mobile station (MS-GW) with the WiMAX network (ASN), the mobile station acting as authenticator (MS-GW) is able to find the authentication server (AAA-ME) of the respective home network (HN2) of the mobile station.

The mobile terminals must be allocated IP addresses for improved communication. There is provision for an allocation of IP addresses for the mobile terminals (ME). This can for example be done through a so-called DHCP relay functionality in the mobile station used as the gateway (MS-GW).

It should be noted that the home agent (HA) in the communication serving network (CSN) or in the home network (HN1) can be set up wherever the mobile station is located. The home network can also involve a network of type "CSN" (Connectivity Serving Network).

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
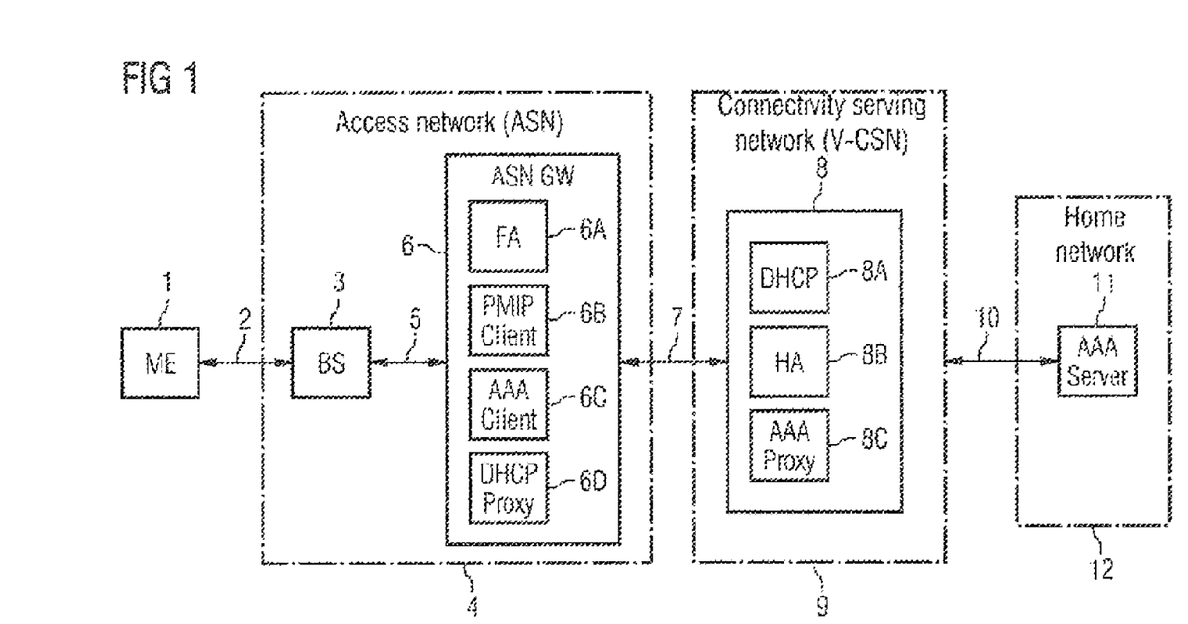
FIG. 1 a network structure or system of networks with network-based mobility management (PMIP) in accordance with the related art.

FIG. 1 shows an example of a network structure or of a system of WiMAX or WLAN networks communicating with each other in accordance with the related art. The communication in the system shown is subject to network-based mobility management (PMIP).

The mobile terminal (ME) 1 is connected via a wireless WiMAX or WLAN interface 2 to a base station (BS) 3 of an access network (ASN) 4. The mobile terminal 1 is any type of mobile terminal, for example a laptop, a PDA, a mobile telephone, or any other mobile station. It does not fulfill any gateway function, but, as the word suggests, is simply a terminal.

The base station (BS) 3 of the access network (ASN) 4 is connected via a data transmission line 5 to a gateway (ASN-GW) 6 of the access network 4. Further functions are integrated into the computer of the gateway 6, especially a foreign agent (FA) 6A, a PMIP client 6B, an authentication server client (AAA-CLIENT) 6C and a DHCP proxy server 6D. The foreign agent 6A is a router which provides routing services for the mobile terminal 1. The data packets directed to the mobile terminal 1 are transmitted tunneled from a home agent (HA) and unpacked by the foreign agent 6A.

The gateway 6 of the access network 4 is connected via an interface 7 to a computer 8 of a Connectivity Service Network (CSN) 9. The computer 8 comprises a DHCP server 8A, a home agent (HA) 8B and a proxy authentication server (AAA-P) 8C. The home agent 8B is the proxy of the mobile terminal 1 if the latter is not located in its original home network 12 (HN1). The home agent 8B is constantly informed about the current location of the mobile computer 1. Data packets for the mobile terminal 1 are initially transmitted to the home agent (HA) and are forwarded tunneled from the home agent (HA) to the foreign agent (FA) 6A.

Conversely data packets which are sent out from the mobile station 1 are sent directly to the respective communication partner. The data packets of the mobile terminal 1 in such cases contain the home address as the sender address. The home address has the same address prefix, i.e. network address and subnet address, as the home agent 8B. Data packets which are sent from other communication partners to the home address of the mobile station 1 are captured by the home agent 8B. The home agent 8B packs this data and transmits it tunneled to the care-of address of the mobile terminal 1 in the area of the access network. At the end point of the tunnel it is received by the foreign agent 6A or the mobile station 1 itself.

The computer 8 of the connectivity serving network 9 is connected via a further interface 10 to an authentication server (AAA Server) 11 of a home network 12 of the mobile station 1.

Figure 2:
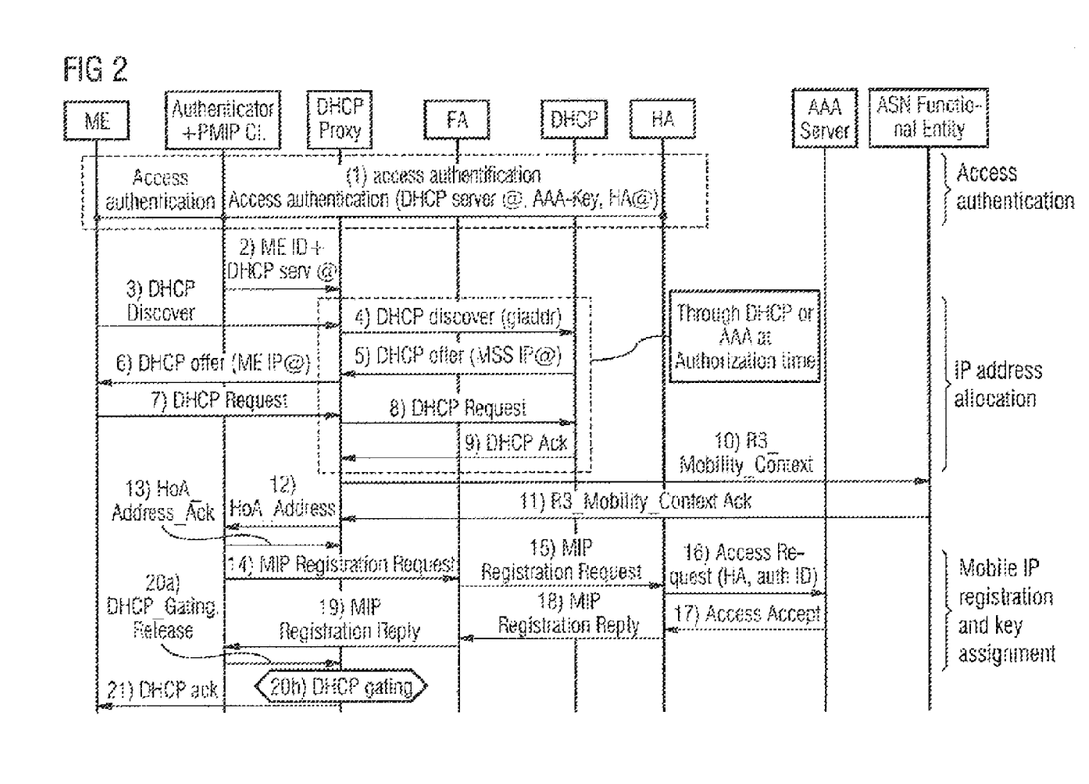
FIG. 2 the connection setup in a network structure according to FIG. 1 with PMIP.

FIG. 2 shows the typical execution sequence of a network registration of the mobile terminal (ME), if the home agent (HA) is located in the visited network, as is shown in FIG. 1. After a radio connection between the mobile terminal (ME) of the base station (BS) is established, an access authentication is first performed. The authentication, the authorization and the accounting are undertaken using authentication servers. Authentication messages are exchanged between the mobile terminal (ME) and the authentication server (AAA Server) of the home network (HN). On the basis of this exchange of messages the address of the home agent (HA) and an authentication key are obtained.

The authentication server (AAA Server) in the home network (HN) holds the profile data of the subscriber. The authentication server initially receives an authentication request which includes a subscriber identity of the mobile station (ME). After successful access authentication the authentication server then creates an MSK key (MSK: Master Session Key, in FIG. 2) to protect the data transmission link between the mobile station MS and the base station of the access network ASN. The MSK key is transmitted from the authentication server of the home network (HN) via the connectivity serving network (CSN) to the access network (ASN).

With network-based mobility management (PMIP) the mobile terminal (ME) does not support Mobile IP. Corresponding MIP software cannot for example be installed or activated in the mobile terminal.

The gateway 6 provides the authenticator and the PMIP client for the mobile station (ME), and thereby takes over its Mobile IP communication.

In a response message from the authentication server an address of the responsible DHCP servers, a key (AAA key) obtained for communication with the authentication server and the address of the responsible home agent (HA) are transmitted to the PMIP client 6B. In a further step the DHCP proxy 6D is configured on the basis of this data.

In the proxy Mobile IP the mobile station (ME) detects only one of the two IP addresses allocated by the DHCP server. Only the care-of address allocated by the DHCP servers is known to the mobile terminal, the home address is not known to the mobile terminal itself but only to the PMIP client, the foreign agent and also the home agent. In the case of terminal-based mobility management (CMIP) the mobile station 1 would know both its IP addresses, the home address and also the care-of address.

After successful authentication and authorization the mobile station MS sends a so-called DHCP Discovery message. A dialog is now undertaken with an IP address allocation between mobile terminal (ME), DHCP proxy and DHCP server.

After the IP address allocation there is an MIP registration, with the home agent being informed about the current location of the mobile station. For its registration the PMIP client sends representing the mobile station sends a registration request to the home agent (HA) containing the current care-of address. The home agent accepts the care-of address and replies with a registration reply.

Since in principle each computer can send a registration request to a home agent, it would be a simple matter to fool a home agent into believing a computer or a mobile terminal had moved to another network. To prevent this, both the mobile terminal and also the home agent have a common secret key (PMIP key), the PMIP key or mobility key which differs from the authentication key (AAA key).

The registration request is transmitted by a PMIP client within the access network via a foreign agent (FA) to the home agent (HA). The home agent (HA) can be allocated by the associated authentication server (AAA server) the key for the subscriber and transmits this with the MIP registration reply via the home agent (HA) to the PMIP client.

With network-based mobility management (PMIP) a common mobility key (PMIP key) is created via the PMIP client 6B and the home agent (HA) through an authentication server (AAA).

Figure 3:
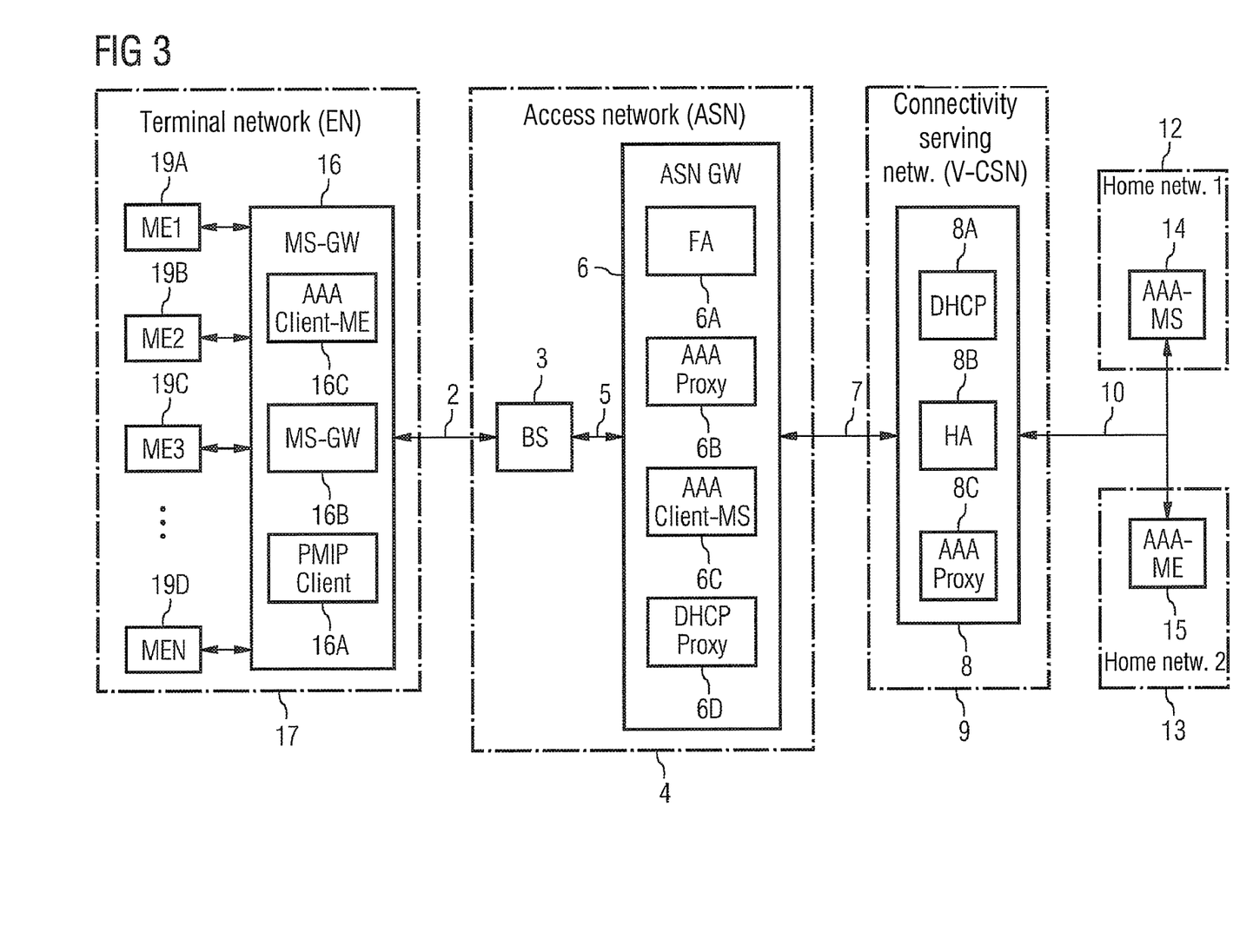
FIG. 3 a network structure or system of networks with network-based mobility management (PMIP) in accordance with one potential embodiment of the invention.

FIG. 3 shows an example of a network structure or of a system of WiMAX networks communicating with each other. The communication in the system shown here is also subject to network-based mobility management (PMIP).

In this example the WiMAX interface is located between a mobile station 16A used as a gateway 16 and the base station 3 of the access network 4. The access network possesses an infrastructure network similar to that depicted in FIG. 1, but without the PMIP client 6B. Instead a PMIP client 16B is located in the gateway 16 of the mobile station 16A.

Over and above this the authentication client 6C (AAA-CLIENTMS) is restricted in the access network to the mobile station 16A or the gateway 16. For the mobile terminals 19A-19D (ME1-MEn) contained in the terminal network 17(EN) covered by the gateway 16 authentication clients 16C are provided in the gateway 16. The mobile terminals 19A-19D communicate with the gateway 16 for their part over WLAN or Ethernet interfaces 18.

Whereas the architecture of the connectivity serving network 9 which is connected via the line 7 to the access network essentially covers the same area as the network structure depicted in FIG. 1, a distinction must be drawn in the example between a home network 12 for the mobile station 16A or the gateway 16 and home networks 13 for the mobile terminals 19A-D. The home network 12 includes an authentication server 14 (AAA-MS) assigned to the gateway 16 assigned and the home networks 13 each include authentication servers 15 (AAA-ME).

Figure 4:
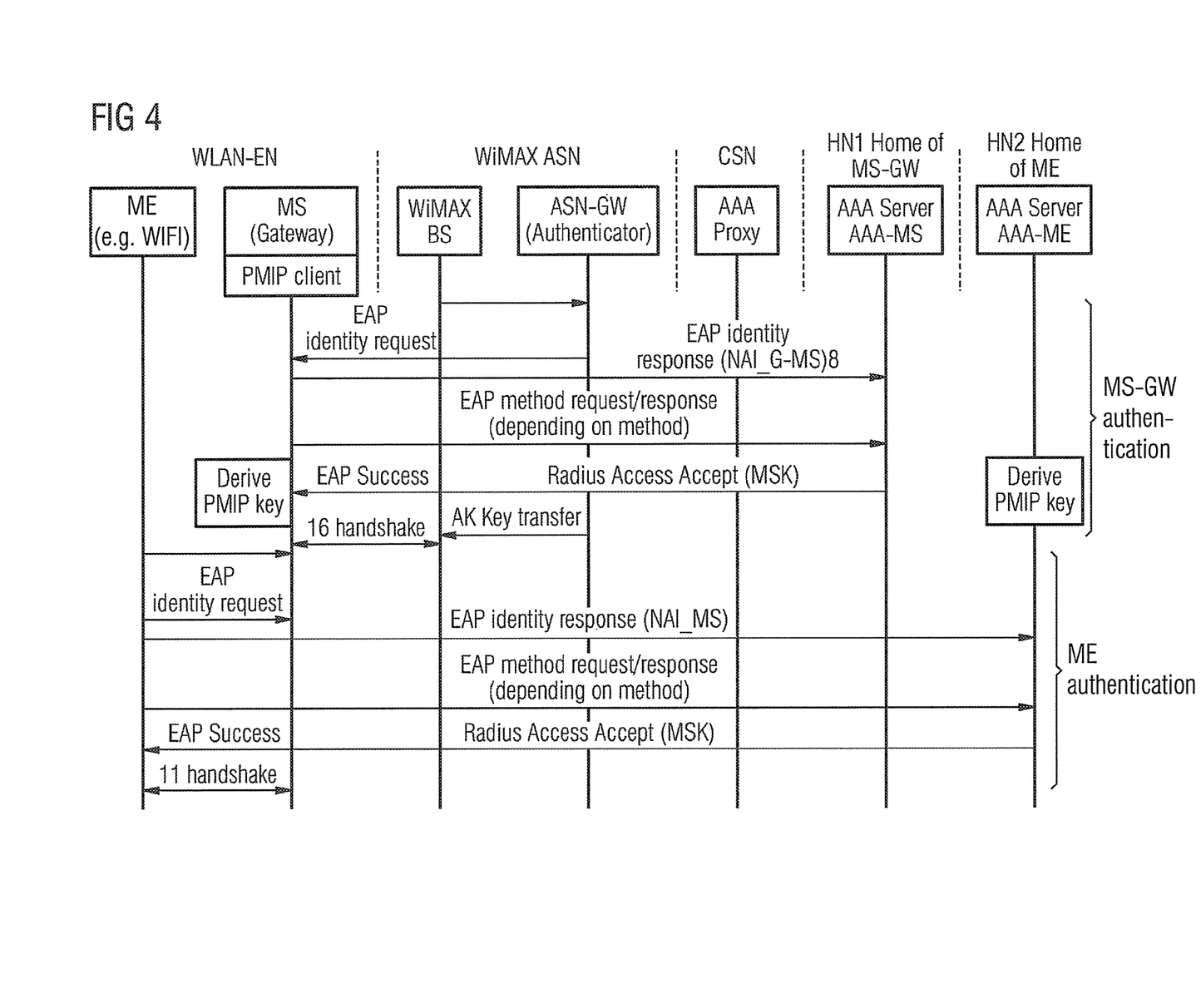
FIG. 4 an extract from the connection setup with authentication steps of the gateway and a ME in accordance with an exemplary potential embodiment of the invention.

FIG. 4 shows an extract from a network registration procedure in accordance with the proposed method. Only the part involving authentication is shown. The authentication is divided into two sections. In a first step the gateway or the mobile station (MS-GW) 16 authenticates itself to the authentication server (AAA-MS) by the authenticator (ASN-GW) 8 (including the authentication client 6C (AAA-MS)) and the proxy authentication server (AAA proxy) 8C. To perform the authentication in this case a conventional EAP method is employed (EAP: Extensible Authentication Protocol, in accordance with IEEE 802.16).

In a second step one of the mobile terminals (ME1-MEn) likewise authenticates itself in accordance with the EAP protocol to its authentication server (AAA-ME) by the mobile station (MS-GW) which functions here as the authenticator.

In this example the authenticator (ASN-GW) after successful authentication receives the key MSK (Master session KEY) from authentication server (AAA-MS). Both the authenticator 8 (ASN-GW) and also the mobile station (MS-GW) used as the gateways 16 obtain the key AK from this key. With this key a secure wireless connection in accordance with IEEE 802.16/16e is undertaken between the mobile stations 16 and the WiMAX base station (BS).

For the PMIP client in the gateway 16 of the mobile station at the end of this step a suitable mobility key (PMIP-KEY) is available, with which the communication to the home agent (HA) can be secured. In the present example the mobility key (PMIP-KEY) is derived on the authentication server (AAA-MS) and mobile station (MS-GW) side from existing key material. The key information is available on both sides because it could be exchanged within the framework of EAP authentication.

In the second step the mobile station used as a gateway exchanges EAP messages with the proxy authentication server in the network of the WiMAX provider (NAP) or in the connectivity serving network 9. The inventors propose that this proxy authentication now has the particular characteristic of resolving the addresses of the respective authentication server (AAA-ME) responsible for the mobile terminals and of exchanging the corresponding messages with these. However this does not exclude the possibility of the authentication servers (AAA-MS) and (AAA-ME) being identical.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A mobile station comprising:
a connection unit to establish a mobile connection between a mobile terminal and an access network with the mobile station acting as a gateway; and
a network-based mobility management unit for the mobile station to appear as a client instead of a mobile terminal user in communicating with a home agent in the course of the mobile connection, the home agent being part of a connectivity service network or a home network, which is connected to the access network for communicating with the mobile station, wherein
the mobile terminal communicates registration information to register with the home agent as part of establishing a connection between the mobile terminal and the access network,
the access network has a proxy authentication server, and the mobile station has:
a first home agent key for securing and authenticating network registration information communicated between the mobile station and the home agent in the connectivity serving network or home network, and/or
a first proxy key for securing and authenticating network registration information transmitted between the mobile station and the proxy authentication server in the access network.

2. The mobile station as claimed in claim 1, wherein
the access network has a base station, and
the mobile station communicates with the base station of the access network over a wireless connection.

3. The mobile station as claimed in claim 1, wherein the wireless connection is a WiMAX Standard IEEE 802.16 connection.

4. The mobile station as claimed in claim 1, wherein the mobile station communicates with the mobile terminal over a wireless connection.

5. The mobile station as claimed in claim 4 wherein the wireless connection is a WLAN standard IEEE 802.11 connection.

6. The mobile station as claimed in claim 1, wherein the mobile station communicates with the mobile terminal over a wired connection.

7. The mobile station as claimed in claim 6, wherein the wired connection is an Ethernet Standard IEEE 802.3 connection.

8. The mobile station as claimed in claim 1, wherein
the mobile terminal has a home mobile terminal network with a mobile terminal authentication server,
the mobile terminal authenticates itself with the mobile terminal authentication server during which key information is assigned, and
the first home agent key is derived for network-based mobility management from the key information.

9. The mobile station as claimed in claim 1, wherein
a plurality of mobile terminals connect with the access network,
all of the mobile terminals use the same first home agent key for communication with the home agent and/or use the same first proxy key for communication with the proxy authentication server.

10. A mobile station comprising:
a connection unit to establish a mobile connection between a mobile terminal and an access network with the mobile station acting as a gateway; and
a network-based mobility management unit for the mobile station to appear as a client instead of a mobile terminal user in communicating with a home agent in the course of the mobile connection, the home agent being part of a connectivity service network or a home network, which is connected to the access network for communicating with the mobile station;
a terminal-based mobility management unit for the mobile station to appear as a client in a Mobile IP connection, wherein
the mobile terminal communicates registration information to register with the home agent as part of establishing a connection between the mobile terminal and the access network,
the access network has a proxy authentication server, the mobile station has:
  a first home agent key for securing and authenticating network registration information communicated between the mobile station and the home agent in the connectivity serving network or home network, and/or
  a proxy key for securing and authenticating network registration information transmitted between the mobile station and the proxy authentication server in the access network,
the access network has a foreign agent for terminal-based mobility management,
a second key secures communication between the mobile station and the home agent and the foreign agent in the access network within the framework of terminal-based mobility management, and
at least one of the first home agent key and the first proxy key is derived from the second key.

11. The mobile stations as claimed in claim 10, wherein at least one key, the second one the first home agent key and the first proxy key is preconfigured in the mobile station.

12. A network comprising:
a mobile terminal;
a connection unit to establish a mobile connection between the mobile terminal and an
access network with a mobile station acting as a gateway; and
a network-based mobility management unit for the mobile station to appear as a client instead of a mobile terminal user in communicating with a home agent in the course of the mobile connection, the home agent being part of a connectivity service network or a home network, which is connected to the access network for communicating with the mobile station wherein
the network comprises a plurality of mobile terminals,
the home agent is part of a mobile station home network,
the mobile terminals each possess a subscription with a respective mobile terminal home network, and
at least one of the mobile terminal home networks is a network other than the mobile station home network.

13. A method for secure network registration of a mobile station used as a gateway and for secure registration of a mobile terminal, which communicates with the mobile station, the method comprising:
authenticating the mobile station to a first authentication server of a first home network to which the mobile station belongs, the mobile station being authenticated using an authentication server client in an access network; and
authenticating the mobile terminal after the mobile station is authenticated, the mobile terminal being authenticated to a second authentication server provided in a second home network to which the mobile terminal belongs, the mobile terminal being authenticated using the mobile station as an authenticator and using a proxy authentication server in the access network.

14. The method as claimed in claim 13, wherein the first home network and the second home network are different networks.

15. The method as claimed in claim 13,
wherein the mobile station is authenticated to the first authentication server on the basis of an EAP protocol in accordance with Standard IEEE 802.16.

16. The method as claimed in claim 13, wherein
while authenticating the mobile station, common key information is negotiated between the mobile station, and the first authentication server, and
from the common key information, first keys are derived in the mobile station and in the first authentication server.

17. The method as claimed in claim 13, wherein
while authenticating the mobile station common key information is negotiated between the mobile station and the first authentication server, and
from the common key information, first keys are derived in the mobile station and in the proxy authentication server of the access network.

18. The method as claimed in claim 13, wherein
a first key is preconfigured in the mobile station and:
  in the first authentication server or in a home agent; or
  in the proxy authentication server of the access network or a foreign agent, and
the first key secures signaling for network registration of the mobile terminal.

19. The method as claimed in claim 13, wherein
the mobile station derives at least one first key from a second key, and
the mobile station uses the second key for its own communication as a terminal in a mobile-IP connection defined by a terminal-based mobility management protocol.

* * * * *